United States Patent [19]
Dunlap et al.

[11] 3,915,257
[45] Oct. 28, 1975

[54] AIR CUSHION SEISMIC SOURCE

[75] Inventors: Henry F. Dunlap; Henry B. Ferguson, both of Dallas, Tex.

[73] Assignee: Atlantic Richfield Company, Los Angeles, Calif.

[22] Filed: Sept. 20, 1973

[21] Appl. No.: 399,177

Related U.S. Application Data

[63] Continuation of Ser. No. 277,366, Aug. 2, 1972, abandoned, which is a continuation-in-part of Ser. No. 39,590, May 22, 1970, abandoned.

[52] U.S. Cl.............................. 181/114; 181/401
[51] Int. Cl.²........................................ G01V 1/02
[58] Field of Search.......... 181/.5 VM, .5 NC, .5 H, 181/.5 EC, 114, 401

[56] References Cited
UNITED STATES PATENTS

| | | | |
|---|---|---|---|
| 3,701,968 | 10/1972 | Broding | 181/.5 VM |
| 3,727,717 | 4/1973 | Miller | 181/.5 VM |
| 3,792,751 | 2/1974 | Fair | 181/.5 VM |

Primary Examiner—Maynard R. Wilbur
Assistant Examiner—G. E. Montone
Attorney, Agent, or Firm—Robert M. Betz

[57] ABSTRACT

A seismic pressure pulse generator, e.g. air gun or gas exploder, is mounted on a ground effect machine so that it fires into the air cushion supporting the machine. The pressure pulse thus generated is coupled and transmitted to the earth surface beneath the machine producing a seismic impulse or wave.

3 Claims, 8 Drawing Figures

SEISMIC PRESSURE
PULSE GENERATORS
24

AIR CUSHION SEISMIC SOURCE

CROSS REFERENCES TO RELATED APPLICATIONS

This is a continuation of application Ser. No. 277,366, now abandoned filed Aug. 2, 1972, which was a continuation-in-part of application Ser. No. 39,590, filed May 22, 1970, and abandoned Aug. 23, 1972.

BACKGROUND OF THE INVENTION

The present invention relates to seismic exploration and particularly pertains to means for generating acoustical waves by firing into the air cushion supporting a ground effect machine.

Due to the discovery of oil on the North Slope, there has been tremendous interest of late in performing seismic exploration activities in the Arctic. However, explorationists have been hindered in their endeavors due to transportation and logistics problems. Conventional seismic equipment loaded on trucks, track vehicles, and sleds have been used with but limited success. Movement is difficult in the winter due to the severe cold and icing and becomes nearly impossible during the summer when the terrain becomes a vast swampy morass.

Even if seismic surveys could easily be run in the Arctic, another problem that must be carefully dealt with is conservation of the environment. Traffic across tundra and permafrost regions can cause deep scars in the landscape that will not heal for years. Any seismic work must therefore be done in such a manner that no permanent harm is done to the environment. It would be best if seismology could be carried out entirely from the air without the use of land vehicles.

Recently, attempts have been made to run seismic surveys in the Arctic by setting out the energy sources and detector stations from helicopters. Also, there have been limited attempts to use ground effect machines or air cushion vehicles to transport and deposit seismic surface sources. In this case, the sources are positioned by swinging them over the side of the vehicle so that they rest on the ground or are submerged in water. Unfortunately, all procedures to date have proved to be slow, cumbersome, and appear ill-suited for practical field work.

One proposal for generating seismic impulses is advanced by Hamilton in his U.S. Pat. No. 3,547,218, in which he discloses utilizing a helicopter to develop seismic impulses from the rotor blades as the helicopter is flown into and away from close proximity to each intended test site. One of the inherent problems with such method, and with other methods in which acoustic waves are generated above the surface to which they are to be imparted, is that the efficiency of energy transfer to the ground or medium below the surface is very small. Therefore, such above surface acoustic wave generating apparatuses are essentially ineffectual except perhaps to limited shallow depth explorations.

It is an object of this invention to provide a novel seismic surface source that can be used in any terrain. Another object is to provide a process and apparatus for generating seismic waves from a ground effect machine. Another object is to provide a seismic exploration system that will not harm or damage the environment.

SUMMARY OF THE INVENTION

The present invention concerns a process and apparatus for seismic exploration utilizing a ground effect machine or air cushion vehicle as a platform for generating seismic waves.

The essence of the invention is the idea of generating seismic waves from a ground effect machine by producing a pressure pulse in the air cushion supporting the machine such that a compressive force is transmitted to the surface of the earth. The requisite pressure pulse can be generated by shooting an air gun into the air cushion beneath the ground effect machine or by venting the explosion gases resulting from ignition of a gas exploder into the air cushion. A deck of the ground effect machine under which the supporting air cushion is maintained provides means for reflecting or coupling the generated pressure pulse to the surface over which the ground effect machine is operated. Additionally, reflective plates are used in one embodiment of the invention to further enhance the pressure pulse coupling to the surface.

As used herein, the term "gas exploder" means any device for generating gases by internal combustion or diesel burning.

A single seismic pressure pulse generator can be used to practice the invention; however, preferably a plurality of generators are mounted on the ground effect machine. These can then be fired in unison to achieve maximum power, or sequentially in order to transmit a coded signal into the earth. Usually a plurality of seismic impulses will be generated at each shot point location so that the resulting seismic signals can be enhanced by summation processes.

Seismic signals can be generated by this process with the ground effect machine located over either land or water. In the case of land operations, a flexible skirt is used around the entire perimeter of the ground effect machine. This same arrangement can be used for marine operations; however, preferably the ground effect machine is provided with permanent or retractable rigid side walls to minimize pressure loss, and to further enhance the coupling to the surface.

A unique feature of this invention is that seismic waves can be generated with the ground effect machine riding its air cushion without the necessity of depositing a seismic source on the ground or lowering a source under water. According to Applicants' invention, a compressive force or seismic impulse can be imparted to the earth by generating pressure pulses in the volume of air beneath the ground effect machine. Hence, the entire ground effect machine may be looked upon as a self-propelled, all-terrain seismic source.

The apparatus invented by Applicants for generating seismic waves is the combination of a ground effect machine and seismic pressure pulse generating means in such a manner that pressure pulses can be produced in the air cushion supporting the machine. One or more air guns or gas exploders are mounted on the decks of the ground effect machine so that they shoot or discharge into the air cushion. Releasing a volume of high-pressure gas into the air cushion creates a temporary pressure surge which is transmitted to the surface of the earth as a seismic impulse. A deck of the ground effect machine reflects pressure waves or pulses which have been reflected from the surface back onto the surface to couple the pulses thereto. A quick-release valve is used on the seismic pressure pulse generators in order to introduce the pressure built up in the generators to the air volume under the air effect machine.

DESCRIPTION OF THE PREFERRED EMBODIMENT(S)

Figure 1:
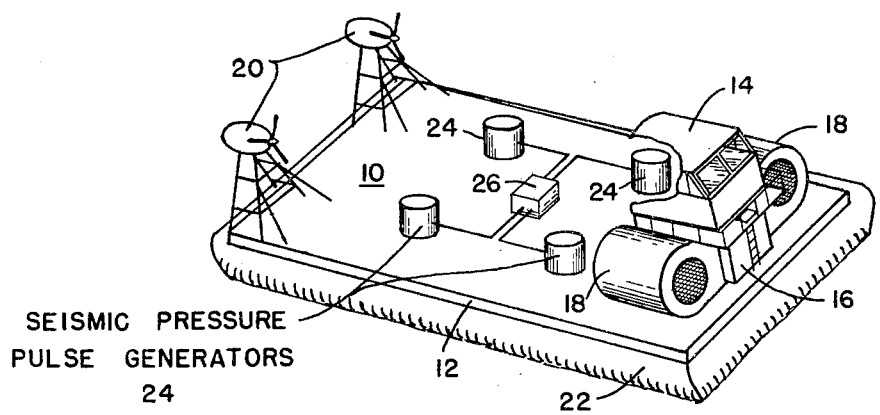
FIG. 1 is a schematic representation of a ground effect machine outfitted with seismic pressure pulse generators according to the present invention.

Referring to FIG. 1 of the drawings, the principles of the invention are shown as applied to ground effect machine or air cushion vehicle 10. Ground effect machine 10 is comprised of deck 12, cabin 14, gas turbine engine 16, lift fans 18, propulsion engines 20, and skirt means 22. Mounted on deck 12 are four seismic pressure pulse generators 24 connected to firing control means 26. Seismic pressure pulse generators 24 are designed to discharge or inject blasts of high pressure gas or air into the volume of air contained beneath ground effect machine 10.

Ground effect machines of the type shown are available from Transportation Technology, Inc., Dallas, Texas, and are specially designed as Arctic transporters. Machine 10 is capable of speeds over 45 mph with normal payload. Range at cruise speed (30 mph) is on the order of 365 miles; endurance at cruise speed is 11 hours. Overall length is 68 feet; overall width is 38 feet; and skirt height is 4.5 feet. The area of deck 12 between fans 18 and propulsion engines 20 is approximately 35 × 40 feet and is floored with rectangular structural steel tubing. The lift system comprises centrifugal fans 18 of aluminum construction driven by an 1100 horsepower industrial gas turbine engine 16. Skirt means 22 is of the peripheral bag type and is constructed of polyester reinforced rubber. Two 3-blade controllable pitch propeller engines 20 are used for propulsion. Cabin 14 is constructed of aluminum alloy and has the vehicle engine controls and instruments. Normal gross weight is 107,000 pounds and normal payload is 40,000 pounds.

Seismic pressure pulse generators 24 are geometrically spaced on deck 12 so that these pressure pulses will be equally distributed to the air volume beneath ground effect machine 10 when generators 24 are fired in unison. It is important to balance the location and time the firing sequence to prevent machine 10 from tilting or being lifted at one end. A heavy load is desired on machine 10 in order to keep it from bouncing when generators 24 are fired.

Figure 2:
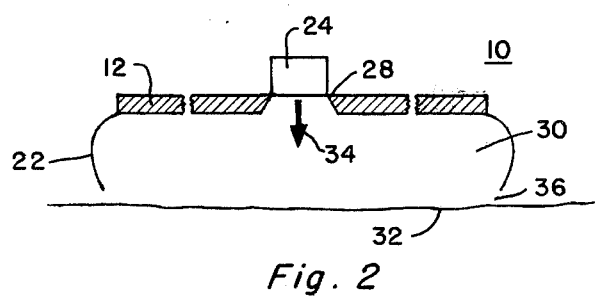
FIG. 2 is a schematic cross-sectional view of a skirted ground effect machine mounting a seismic pressure pulse generator.

The manner in which generators 24 are attached to machine 10 is shown in FIG. 2. Each generators 24 secures to the top of a conical channel 28 forming an air tight connection. Channel 28 extends from deck 12 underneath machine 10 to air cushion 30. It will be seen that machine 10 rides above ground surface 32 being supported by the air pressure contained by skirt means 22. In this embodiment skirt means 22 extends around the entire perimeter of machine 10 so that movement can be made over any type of terrain (land or water). Preferably, the skirt ends are tied back to the central frame making the skirt as incompressable as possible.

In operation, a charge of high pressure air or gas is built up in seismic pressure pulse generator 24 and suddenly vented into channel 28. This produces a pressure pulse in air cushion 30 as indicated by arrow 34. Due to the rapid pressure change, a compressive force is transmitted against ground surface 32 resulting in the propagation of a seismic wave. After a short time lag, the air pressure under machine 10 returns to normal because of leakage of air through air gap 36. Meanwhile, generator 24 is recharged and made ready to fire a second time. This sequence of operations can be repeated as many times as desired in order to produce a series of seismic waves for stacking purposes. As noted above, several generators 24 may be fired at the same time or in predetermined sequence. Firing of multiple units is controlled by firing control means 26 (FIG. 1) using off-the-shelf equipment and procedures well known to those skilled in the seismic art.

Figure 3:
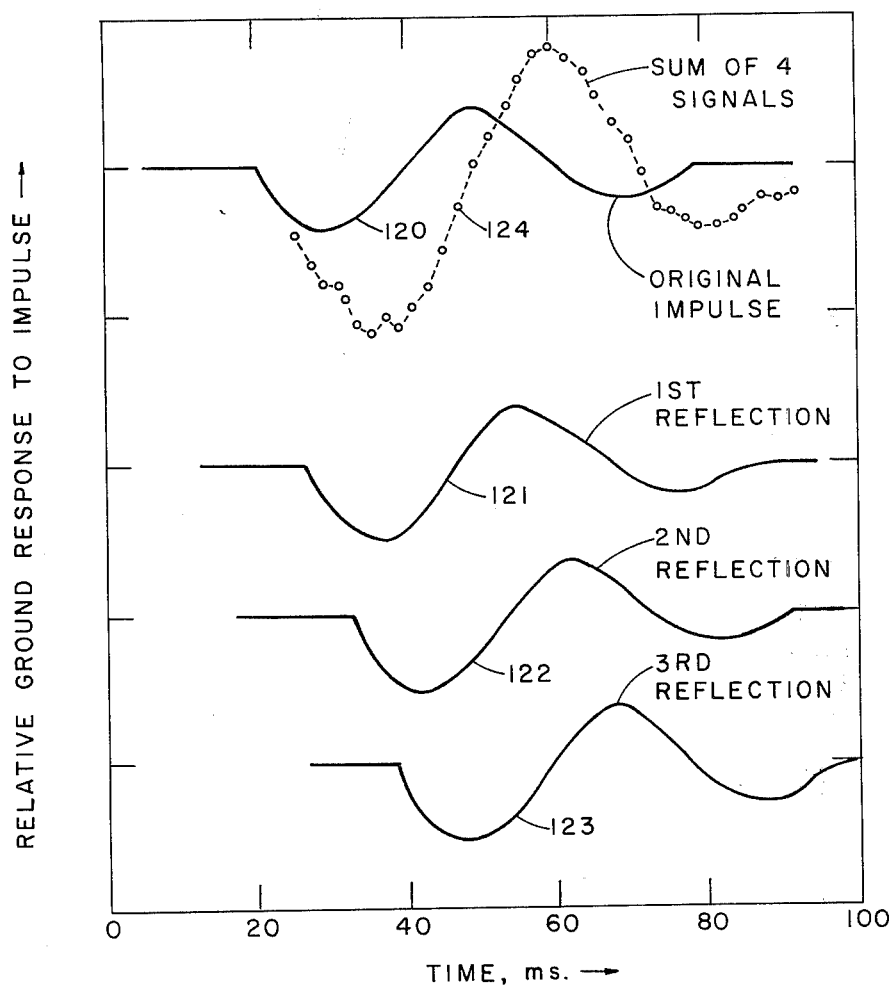
FIG. 3 is graphs of the original, reflected, and sums of the generator pressure pulses within the air cushion of a ground effect machine, in accordance with the principles of the invention.

The pressure pulses from the pressure pulse sources 24 will, of course, be reflected to a certain degree from the earth surface 32. Although the ground response to an impulse will vary from place to place, a typical response might be that shown by curve 120 in FIG. 3. Since the impulse is essentially a spherical shock wave, it will propagate outwardly until it reaches the ground, is reflected up to the vehicle deck, reflected down, and so forth. After a few reflections back and forth between the deck and the ground, the spherical nature of the wave front will have spread the energy laterally so that the amount of bouncing back and forth under the air gun will be negligible. The first several reflections shown by curves 121, 122, and 123, however, will be added, achieving an impulse represented by curve 124, which is, perhaps, slightly wider than the original impulse, but has considerably greater magnitude. If, for example, the amplitude of the original pulse is doubled, the resulting pulse would present four times the energy.

Figure 4:
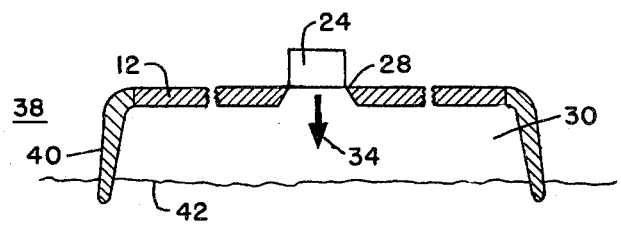
FIG. 4 is a schematic cross-sectional view of a rigid wall ground effect machine mounting a seismic pressure pulse generator.
Figure 5:
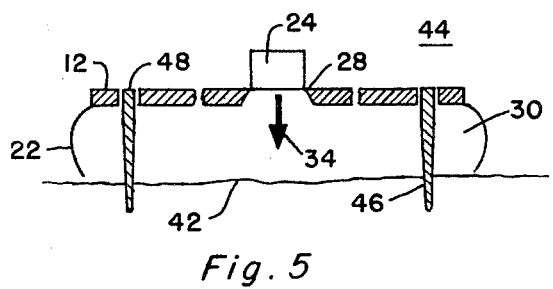
FIG. 5 is a schematic cross-sectional view of a skirted ground effect machine having retractable rigid side walls and mounting a seismic pressure pulse generator.

FIGS. 4 and 5 represent alternate embodiments of the invention adapted for marine use. Structures which are the same as in FIGS. 1 and 2 are indicated by the reference numbers previously used; changes in structure are indicated by new reference numbers.

Referring first to FIG. 4, instead of having flexible skirts around its entire periphery, ground effect machine 38 has rigid side walls or keels 40 that penetrate water surface 42 on each side. Of course, machine 38 will still have a flexible skirt (not shown) at its bow and stern. This arrangement entraps air cushion 30 better than the conventional total skirt design and provides high vehicle efficiency and excellent control. The disadvantage to this design is that machine 38 can only be operated over water.

Referring to FIG. 5, ground effect machine 44 is shown having skirt means 22 and retractable rigid side walls 46. Skirt means 22 extends around its entire perimeter. For marine use, side walls 46 are lowered into the position shown in FIG. 5 through slots 48 so that they extend inside of skirt means 22. Machine 44 is operated on land by raising side walls 46 to deck level, laying them flat on deck 12, or removing them altogether. This arrangement affords the same advantages as the design shown in FIG. 4 and at the same time provides means for performing amphibious operations (land or water).

It can be seen that by the rigid wall configurations of FIGS. 4 and 5, the acoustic coupling to the surface 42 is increased from that of the flexible skirt embodiments of FIG. 2.

Figure 6:
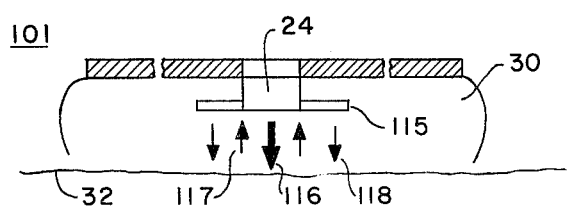
FIG. 6 is a schematic cross-sectional view of a skirted ground effect machine having a pressure pulse generator and reflector plate within the air cushion supporting the machine.

Since the energy of the pressure pulse which is transferred to the surface over which the ground effect machine is operated is dependent, in part, upon the coupling between the pressure pulse and ground, as mentioned above, it is desirable in some instances to enhance the coupling provided by its deck. Thus, as illustrated in FIG. 6, the pressure pulse generator 24 on the ground effect machine 101 is disposed lower than the pressure pulse generators above described with respect to FIGS. 2–4, and is within the air cushion 30. A reflector plate 115 is attached to the pressure pulse generator 24 at a desired height above the ground surface 32. As the pressure pulses are downwardly released by the generator 24, as illustrated by arrow 116, portions of the pressure wave will be reflected back to the source 24 and plate 115, as shown by arrows 117. The plate 115 then reflects the reflected pressure wave back to the earth surface 32, as shown by downward arrows 118. The power generated by the adding of the reflected waves will, therefore, be added, as described above with reference to FIG. 3, to thereby couple manifold times the amplitude of the original wave to the surface 32. For example, by lowering the effective deck by a reflector plate from a typical deck height of 39 inches to approximately 3 inches, 39 or so effective reflections may be expected, which would increase the energy of the pressure wave approximately 169 times.

Figure 7:
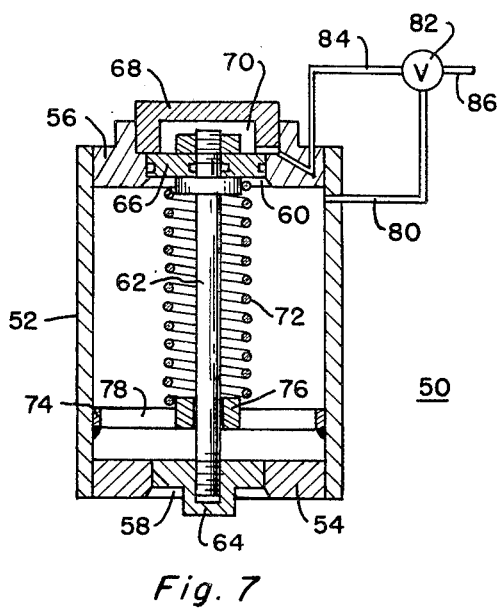
FIG. 7 is a sectional elevational view of a pneumatic acoustical device (air gun) suitable for use with the present invention.

Referring to FIG. 7, a pneumatic acoustical device 50 is shown which is suitable for use as a seismic pressure pulse generator in accordance with the present invention. Acoustical device or air gun 50 is comprised of cylinder 52 having end walls 54 and 56 provided with axially aligned ports 58 and 60, respectively. Port 58 is of somewhat smaller diameter than that of port 60 for a purpose to be described later. Piston rod 62 extends through cylinder 52 supporting pistons 64 and 66. In one axial position of rod 62, pistons 64 and 66 close ports 58 and 60 and in another position, open ports 58 and 60. End wall 56 includes a hollow cap member 68 that forms a chamber 70 having one side closed by piston 66 when in its uppermost position. A spring 72 within cylinder 52 acts against the bottom surface of piston 66. Spring 72 at its other end rests against disk 74 fixed to the sidewalls of cylinder 52. Piston rod 62 makes a sliding fit with bored boss 76 on disk 74. Air passages 78 are provided in disk 74 to allow free flow of air. From the aforegoing, it is evident that spring 72 normally assists in the return of piston rod 62 and pistons 64 and 66 to the position shown in FIG. 7. Cylinder 52 is connected through line 80 to valve 82. Line 84 leads from valve 82 to chamber 70 and line 86 connects valve 82 to a high pressure compressor (not shown).

In operation, valve 82 is actuated to connect line 86 to line 80 so that cylinder 52 is pressurized with high pressure air. Since piston 66 is of greater area than piston 64, gun 50 remains in the condition shown in FIG. 7. Upon operating valve 82 to connect lines 80 and 84, pressure in cylinder 52 and chamber 70 is equalized. This causes rod 62 and pistons 64 and 66 to move downwardly very rapidly permitting the rapid escape of air pressure from cylinder 52 through port 58 and ejecting a slug of high pressure air. Operating valve 82 to vent chamber 70 causes spring 72 to return rod 62 and pistons 64 and 66 to their original positions. Valve 82 is actuated to connect lines 86 and 80 to recharge cylinder 52 and completes the cycle.

Figure 8:
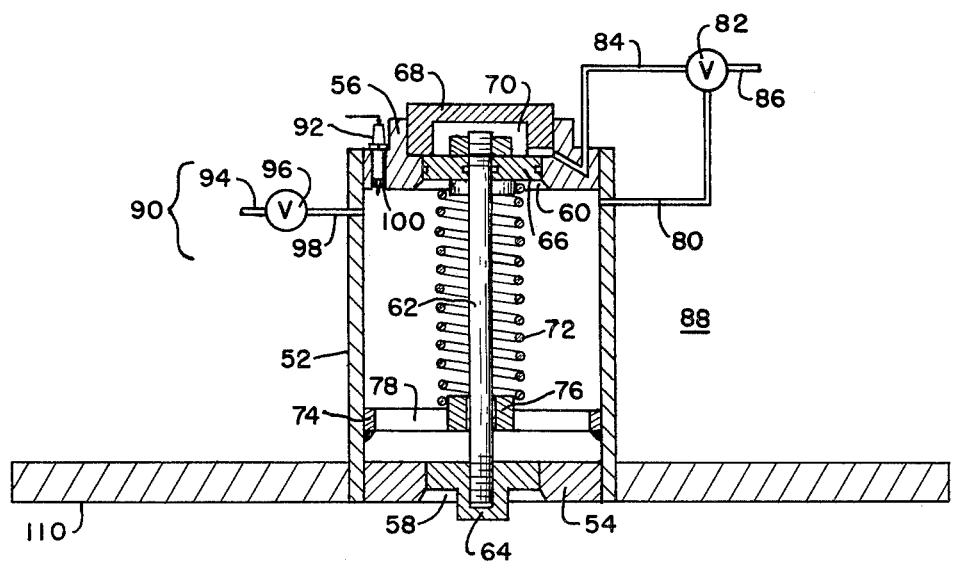
FIG. 8 is a sectional elevational view of a gas exploder suitable for use with the present invention, including a reflector plate for enhanced acoustic coupling.

Referring to FIG. 8, another seismic pressure pulse generator is shown designed as a gas exploder rather than an air gun. Gas exploder 88 is similar to air gun 50 except that it includes fuel injection means 90 and spark plug 92. Hydrocarbon fuel, e.g., propane, butane, diesel oil, etc., is admitted by line 94, valve 96, and line 98 to cylinder 52. Spark plug 92 is inserted in threaded bore 100 by end wall 56.

In operation, valve 82 is actuated as explained above to admit compressed oxygen and/or air through line 86 to cylinder 52. Pressurized hydrocarbon fuel is injected by actuating valve 96 to connect lines 94 and 98. When cylinder 52 is charged with a combustible mixture of gases and pressurized to the desired level, valves 86 and 96 are closed. Spark plug 92 is then fired producing an explosion which greatly increases the pressure within cylinder 52. Following the explosion, valve 82 is actuated to connect lines 80 and 84 to equalize the pressure in cylinder 52 and chamber 70. This causes a downward thrust of rod 62 and pistons 64 and 66 finding a high energy pressure pulse from port 58. The advantage of gas exploder 88 over air gun 50 (FIG. 7) is that high compression can be achieved without the necessity of having a large compressor. Also, gas exploders can be readied to fire much faster than pneumatic devices.

Additionally shown in FIG. 6 is a plate 110 carried by the exploder 88 near the pressure outlet 58 to reflect portions of the pressure pulse reflected from the surface back onto the surface, similar to that described above with reference to FIG. 6. To still further enhance the coupling, the height at which exploder 88 is carried with respect to the underlying surface may be adjusted, for example, to locate the pressure outlet 58 and the reflecting plate 110 several inches from the surface. It is understood, of course, that the pressure plate 110 is shown on the exploder 88 for illustration, and may be equally advantageously employed with other seismic pressure pulse generators, such as the pneumatic acoustical device or air gun 50 of FIG. 7 in a similar fashion.

While detailed disclosure has been made of two embodiments for a seismic pressure pulse generator, it is evident that many changes may be made in the details and that other devices are available that can be readily modified to function in accordance with the invention. Generally, the invention is directed toward any means for generating a pressure pulse wherein the pulse can be transmitted to the air volume under a ground effect machine by means of a quick-release valve or the like.

It is of interest to calculate the magnitude of the seismic impulse that can be produced by the present invention. The ground effect machine in FIG. 1 has a cushion area of $68 \times 38 = 2.58 \times 10^3$ square feet and a cushion volume of $68 \times 38 \times 4.5 = 1.16 \times 10^4$ cubic feet. Over pressure to support its normal gross weight of 107,000 pounds is $1.07 \times 10^5/2.58 \times 10^3 = 41.5$ pounds/square feet or 0.287 psi. It follows that the air pressure supporting the ground effect machine is $14.69 + 0.287 = 14.98$ psi. In order to obtain a force equal to one g of acceleration, enough compressed air or gas must be released into the cushion volume to raise the pressure an additional 0.287 psi. The volume of air required at 14.98 psi to achieve this pressure increase would be $0.287 \times 1.16 \times 10^4/14.98 = 222$ cubic feet. If an air gun is employed which operates at 2000 psi (136 atmosphere), $222/136 = 1.63$ cubic feet of 2000 psi air must suddenly be released into the cushion volume. This means the air gun should have a capacity of 2840 cubic inches. Rather than use one gun, four guns, each of 710 cubic inch capacity, could be fired simultaneously. The energy available in 2840 cubic inches of air (expanding to 14.98 psi at conditions between isothermal and adiabatic) is on the order of $3.0 \times 10^6$ ft./lbs. The energy in 1 pound of TNT is $1.5 \times 10^6$ ft./lbs. so that we are dealing with total energies in the system equal to about two pounds of explosives.

Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. Apparatus for generating a seismic signal from a vehicle having a flat deck:
   a. means carried by the vehicle for maintaining a volume of pressurized air there beneath supporting the vehicle above a surface;
   b. means for generating a seismic pressure impulse within the volume of pressurized air whereby the pressure impulse is transmitted downward within the volume of pressurized air to the surface; and
   c. at least one acoustic reflector plate dependently supported from said vehicle within said volume of pressurized air intermediate said deck and said surface and adapted to amplify said pressure impulse, said pressure impulse being released between said at least one reflector plate and said surface.

2. The apparatus of claim 1 wherein said at least one flat reflector plate is provided with a pressure port extending therethrough and wherein said generating means are adapted to eject high pressure air through said port toward said surface.

3. The apparatus of claim 1 wherein said generating means comprises a plurality of spaced apart pressure impulse generators mounted on said deck and wherein said at least one flat reflector plate comprises a plurality of reflector plates carried respectively by said plurality of pressure impulse generators, whereby the pressure impulse generated by each of said generators is released between a respective one of said reflector plates and the surface.

* * * * *